(12) United States Patent
Mousavi (10) Patent No.: US 10,819,248 B2
(45) Date of Patent: Oct. 27, 2020

(54) TECHNOLOGIES FOR PROVISIONING POWER CONTROLLERS FOR GRID SERVICES

(71) Applicant: ABB Schweiz AG, Baden (CH)

(72) Inventor: Mirrasoul J. Mousavi, Cary, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/504,208

(22) Filed: Jul. 5, 2019

(65) Prior Publication Data
US 2020/0014212 A1    Jan. 9, 2020

Related U.S. Application Data

(60) Provisional application No. 62/694,340, filed on Jul. 5, 2018, provisional application No. 62/694,348, filed on Jul. 5, 2018, provisional application No. 62/694,434, filed on Jul. 5, 2018.

(51) Int. Cl.
*H02M 7/48* (2007.01)
*G05F 1/67* (2006.01)

(52) U.S. Cl.
CPC ............. *H02M 7/48* (2013.01); *G05F 1/67* (2013.01); *H02J 2300/26* (2020.01)

(58) Field of Classification Search
CPC ......... H02M 7/48; G05F 1/67; H02J 2300/26; H02J 3/385
See application file for complete search history.

(56) References Cited

U.S. PATENT DOCUMENTS

| 6,433,522 | B1 * | 8/2002 | Siri | G05F 1/67 320/101 |
|---|---|---|---|---|
| 2006/0132102 | A1 * | 6/2006 | Harvey | G05F 1/67 320/166 |
| 2017/0279376 | A1 * | 9/2017 | Siri | H02M 7/53871 |

OTHER PUBLICATIONS

Mokri et al., "PV System Performance Assessment", www.sunspec.org, Jun. 2014, 28 pages.
Gevorgian et al., "Advanced Grid-Friendly Controls Demonstration Project for Utility-Scale PV Power Plants", Jan. 2016, 102 pages.
"Using Renewables to Operate a Low-Carbon Grid: Demonstration of Advanced Reliability Services from a Utility-Scale Solar PV Plant", 66 pages.

\* cited by examiner

*Primary Examiner* — Kyle J Moody
(74) *Attorney, Agent, or Firm* — Barnes & Thornburg LLP (57) ABSTRACT

Technologies for provisioning power controllers for grid services are disclosed. In at least one illustrative embodiment, a method for estimating real-time available peak power (APP) of a power plant may comprise determining whether an inverter of the power plant electrically coupled to at least one solar panel array of the power plant is operating in a maximum power point tracking (MPPT) mode, obtaining a measured output of the at least one solar panel array in response to determining that the inverter is operating in the MPPT mode, estimating an expected output of the inverter as a function of the measured output of the solar panel array using an inverter production model, and estimating the APP of the power plant as a function of the expected output of the inverter using a site compensation model.

20 Claims, 8 Drawing Sheets

TECHNOLOGIES FOR PROVISIONING POWER CONTROLLERS FOR GRID SERVICES

CROSS-REFERENCE TO RELATED APPLICATIONS

This application claims the benefit of and priority to U.S. Provisional Patent Application Nos. 62/694,340, 62/694,348, and 62/694,434, each filed Jul. 5, 2018, the entire disclosures of which are incorporated by reference herein.

TECHNICAL FIELD

The present disclosure relates, generally, to electrical power systems and, more particularly, to technologies for connecting the electrical output of solar photovoltaics (PV) to a utility power grid.

BACKGROUND

Smart inverters used in solar power generation may be programmed to provide ancillary "grid services" including voltage and frequency regulation, power factor correction, and reactive power control. These advanced functionalities may help stabilize the power system and smooth out rapid fluctuations in supply and demand that result from intermittent solar irradiation and flexible loads. Such grid services may be mandated across the world to enable high penetration of distributed energy resources (DERs), including solar photovoltaics (PV). However, unlike conventional power generation (e.g., coal, gas, nuclear, or hydro), the fuel input (i.e., solar irradiance) required for solar photovoltaic (PV) cells (i.e., solar panel arrays) is intermittent and weather dependent.

The efficiency of power transfer from the solar PV cell depends on both the amount of sunlight falling on the solar panels and the electrical characteristics of the load connected to it. As the amount of sunlight varies, the load characteristic that gives the highest power transfer efficiency changes. As such, the efficiency of the system may be optimized when the load characteristic changes to keep the power transfer at highest efficiency. This load characteristic is called the maximum power point (MPP), and MPP tracking (MPPT) is the process of finding the MPP and keeping the load characteristic at the MPP.

Plant level generation forecast models have been developed to predict plant output for investment planning and long-term forecasting based on historical measurements. However, these existing prediction models do not account for many uncertainties in weather parameters and plant performance for real-time operations.

SUMMARY

According to one aspect of the present disclosure, a method for estimating real-time available peak power (APP) of a power plant may comprise determining whether an inverter of the power plant electrically coupled to at least one solar panel array of the power plant is operating in a maximum power point tracking (MPPT) mode, obtaining a measured output of the at least one solar panel array in response to determining that the inverter is operating in the MPPT mode, estimating an expected output of the inverter as a function of the measured output of the solar panel array using an inverter production model, and estimating the APP of the power plant as a function of the expected output of the inverter using a site compensation model.

In some embodiments, the method may further comprise estimating, using an array production model, an expected output of the at least one solar panel array in response to determining that the inverter is not operating in the MPPT mode. In such embodiments, the method may further comprise estimating, using the inverter production model, the expected output of the inverter as a function of the expected output of the solar panel array.

In some embodiments, the array production model may be a validated model that relates solar irradiance levels to expected outputs of the at least one solar panel array.

In some embodiments, the inverter production model may relate direct current (DC) inputs of the inverter to expected alternating current (AC) outputs of the inverter.

In some embodiments, the site compensation model may characterize local losses associated with the power plant.

In some embodiments, determining whether the inverter is operating in the MPPT mode may comprise referencing set points for the inverter received from a system operator of the power plant.

In some embodiments, the method may further comprise transmitting the estimation of the APP to the system operator for use in updating the set points for the inverter.

In some embodiments, the method may comprise repeating the method to generate a new estimation of the APP of the power plant at least once during every dispatch cycle of the system operator.

In some embodiments, the measured output of the at least one solar panel array is obtained in real-time and without taking the inverter off-line.

According to another aspect of the present disclosure, one or more computer-readable media may store a plurality of instructions that, when executed by a power controller operatively connected to (i) at least one solar panel array and (ii) an inverter electrically coupled to the at least one solar panel array, cause the power controller to perform any of the methods described above and throughout this disclosure.

According to yet another aspect of the present disclosure, a power controller may be configured to perform any of the methods described above and throughout this disclosure. In some embodiments, the power controller may be operatively connected to (i) at least one solar panel array and (ii) an inverter electrically coupled to the at least one solar panel array. In some embodiments, the power controller, the at least one solar panel array, and the inverter may be incorporated in a power plant.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory computer-readable storage medium, which may be read and executed by one or more processors. A computer-readable storage medium may be embodied as any storage device, mechanism, or other physical structure for storing or transmitting information in a form readable by a computing device (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
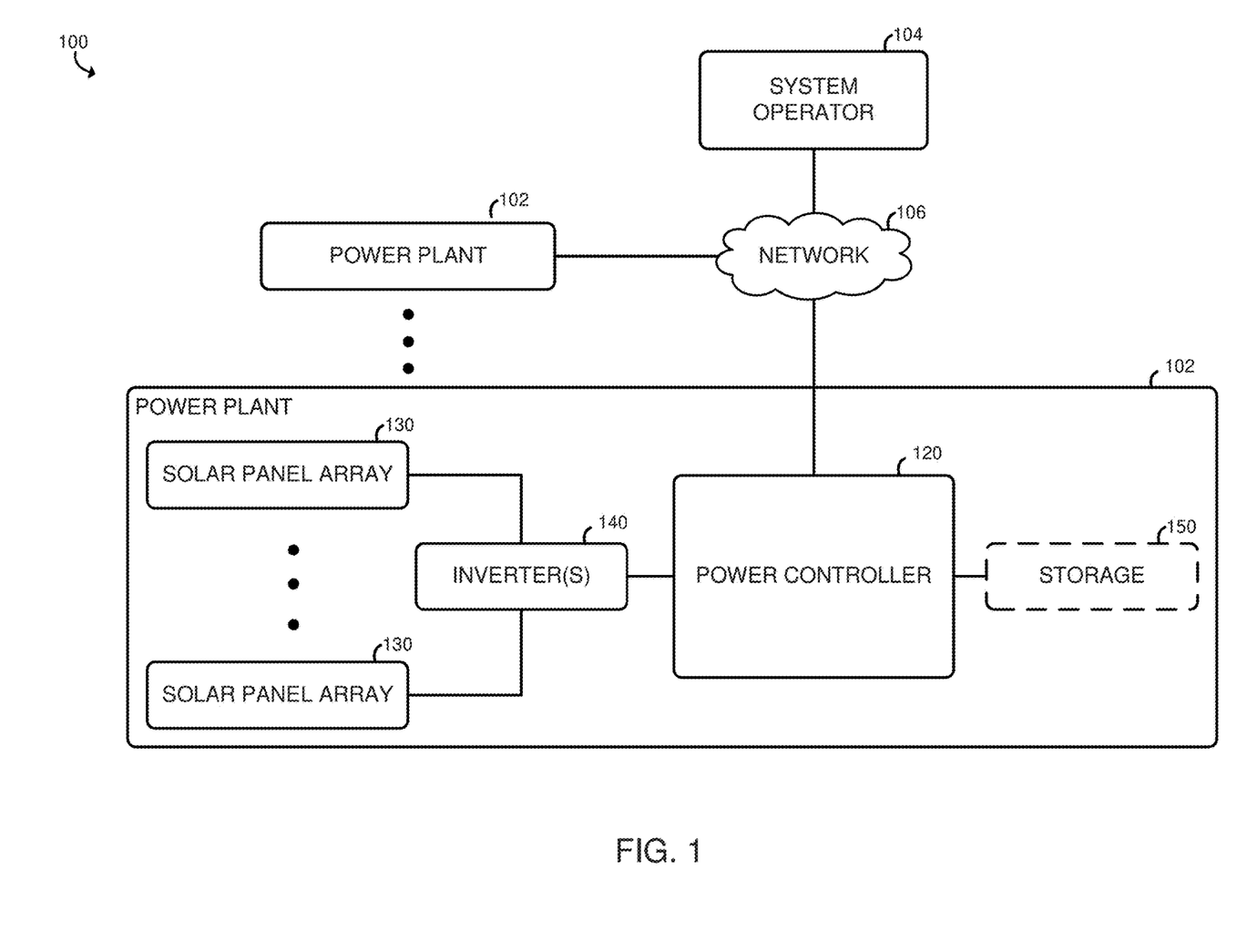
FIG. 1 is a simplified block diagram of at least one embodiment of a power system including a solar power plant and a system operator.

Referring now to FIG. 1, a power system 100 for peak power estimation of a power plant 102 to maintain a target performance includes the power plant 102 that is communicatively coupled to a system operator 104 via a network 106. The peak power estimation is an estimated available peak power (APP) to enable operational planning and market participation features of a grid-tied photovoltaics (PV) system. The power plant 102 may be a large power plant or aggregated small residential or commercial PV resources (e.g., solar panel arrays 130). As suggested in FIG. 1, any number of power plants 102 may be included in the power system 100.

The interaction between the power plant(s) 102 and the system operator 104 may be direct (e.g., for solar farms) or indirect through a third-party aggregator (e.g., for residential solar panels). The power plant(s) 102 may be managed by DERMS (Distributed Energy Resource Management System), commercially available from ABB, Inc. The DERMS is a system for managing and orchestrating the performance of a large number of individual solar generators and other distributed resources. In the absence of a system operator or a link to the system operator, the DERMS receives site capability data and issues coordinated set points for grid support.

Each power plant 102 includes a power controller 120 that is operatively connected to one or more solar panel arrays 130 via one or more inverters 140. For example, in the illustrative embodiment, the inverter 140 is embodied as a direct current (DC) to alternating current (AC) (DAC) converter 140. The power controller 120 is further communicatively coupled to the system operator 104 and is configured to dynamically control performance of the DAC converter 140. The DAC converter 140 is used in solar power generation and may be programmed to provide ancillary grid services, such as, for example, voltage and frequency regulation, power factor correction, and reactive power control. Such a DAC converter 140 may help stabilize the power system 100 and compensate rapid fluctuations in supply and demand that result from intermittent renewable resources. It should be appreciated that, in some embodiments, the power controller 120 may be embodied as part of DAC inverter 140.

In some embodiments, the power plant 102 may include a storage 150 that is configured to store excess energy generated by the solar panel array(s) 120. For example, the storage 150 may be embodied as a battery that is charged during the day and may be used during the night to provide power to loads connected to the power plant 102. It should be appreciated that, in such embodiments, the storage capability may be leveraged in the provision of the PV plant for grid services.

As described above, the operator 104 and the power plant 102 are illustratively in communication via the network 106, which may be embodied as any type of wired or wireless communication network, including, for example, global networks (e.g., the Internet), local area networks (LANs) or wide area networks (WANs), cellular networks (e.g., Global System for Mobile Communications (GSM), 4G, 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

In some embodiments, the power plant 102 may be further divided into sectors with each sector equipped with its own pyranometer that provides a measure of solar flux density (W/m$^2$) or irradiance. In such embodiments, the available power in each sector may be estimated by the power controller 120 using equation (1).

$$P_{sector} = I_{rr} \times Weight_{sector} \times \frac{N_{available}}{N_{total}} \times \text{scale} + \text{offset} \qquad (1)$$

where $I_{rr}$ is solar irradiance in W/m², $Weight_{sector}$ is a weight of a corresponding sector compared to the plant capacity, $N_{available}$ and $N_{total}$ are a number of available and total number of inverters, and scale and offset are unit conversion factors.

As such, the total available peak power at the plant level may be computed by taking the sum of the powers from each sector in the power plant 102. However, in addition to solar irradiation, there are other variables that may impact the available power output, such as solar panel temperatures, inverter efficiency variations corresponding to different load levels, and environmental conditions of the panels affect the actual APP in practice.

In the illustrative embodiment, the power plant 102 may operate in an MPPT mode or a non-MPPT mode. In the MPPT mode, the power plant 102 is configured to maintain an MPP at which the highest efficiency of the power transfer from the solar panel arrays 130 is achieved. In other words, the power plant 102 in the MPPT mode is adapted to output its maximum power extraction under all conditions (i.e., the peak power). For example, in a grid connected PV system, the power controller 120 operating in MPPT mode may attempt to operate the inverter 140 at its maximum power point. In other words, the inverter 140 is set to provide maximum active power output under the unity or constant power factor in the MPPT mode.

In non-MPPT mode, the power plant 102 is set to produce output power that is curtailed by a fraction (e.g., 10%) of its rated or estimated capacity (i.e., available peak power) in order to provide headroom for on-demand up-regulation. As discussed above, in the PV system, the available peak power (APP) fluctuates based on numerous variables and attributes, for example, the amount of solar irradiation falling on the solar panel arrays 130, the solar panel temperatures, and/or inverter efficiencies. As such, in order to maintain or set a target regulation range and curtailment performance, the APP is estimated and communicated to the system operator 104 for market participation. It should be appreciated that the market participation may be established through traditional market constructs such as those practiced in the bulk power system, or through a peer-to-peer mechanisms enabled by technologies such as block chain.

Figure 2:
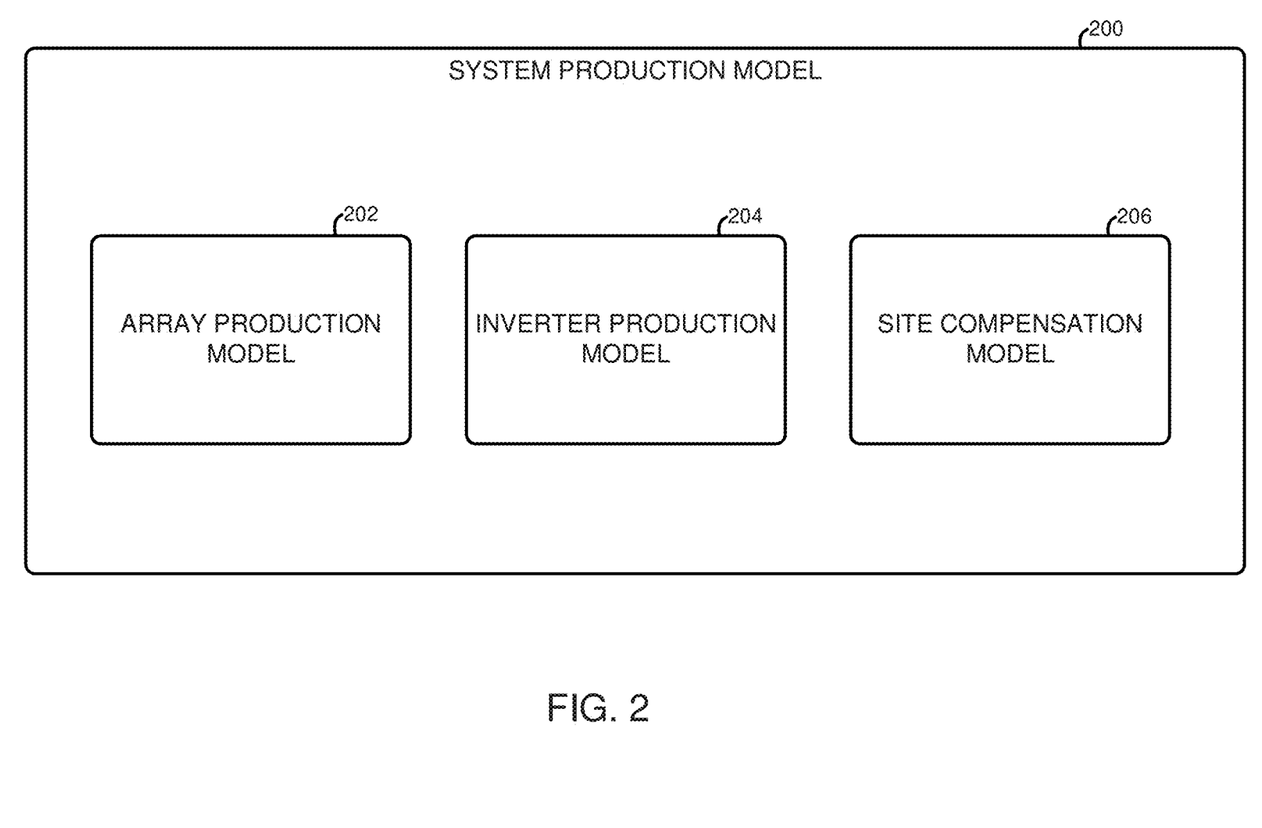
FIG. 2 is a simplified block diagram of at least one embodiment of a system production model for determining output power of the power plant of FIG. 1.

As such, accurate estimation of available peak power is required for reliable AGC (Automatic Generation Control) and ancillary services. In this case, the controller 120 is configured to follow a set point signal received from the system operator 104 periodically. The set point is adjusted at every dispatch cycle based on the estimation of the APP to maintain a target regulation headroom. In the illustrative embodiment, the APP is estimated using a system production model 200 to provide the accuracy of the APP estimation based on the variables and attributes measured in real-time, which is discussed in detail below. The APP is used to optimize the power transfer efficiency from the power plant 102.

In some embodiments, frequency response service may involve peak power estimation. Frequency response is a measure of system ability to stabilize the frequency immediately following a sudden contingency such as loss of generation or load in a grid system. This capability is typically expressed by a droop characteristic in which the output of the power plant 102 is adjusted based on the frequency variation in accordance with the droop curve setting. An upper limit for active power adjustment varies in real-time by the estimated peak power and, therefore, requires continuous updates on the estimated peak power to reflect the latest changes in plant production capability.

Moreover, provisioning the power plant 102 for reactive power support also depends on available peak power (APP) estimation. In other embodiments, the inverters 140 may control active and reactive power independently. Unlike conventional generation, the active and reactive power generated by the solar panel arrays 130 is limited by the current limit only. In order to meet this requirement, the PV inverters 140 need to have Mega-Volt-Ampere (MVA) ratings large enough to handle full active and reactive current and operate at full current with reactive power capability.

Referring now to FIG. 2, the system production model 200 for determining the available peak power (APP) estimation of the power plant 102 is shown. The system production model 200 includes an array production model 202, an inverter production model 204, and a site compensation model 206. By decoupling the array performance from the inverter performance in the model 200, an impact of meteorological parameters and array conditions estimation error may be isolated and allow for characterization and traceability of a significant source of uncertainty in the estimation process. When in the MPPT mode, these variables are incorporated in the estimation method by taking a real-time measurement of DC inputs of the DAC converter 140. However, as discussed above, when inverter is following the commanded set points received from the system operator 104, it may not be at the maximum power point (i.e., non-MPPT mode). In such case, the real-time inputs to the inverter production model 204 are the estimated output values generated by the array production model 202.

Figure 3:
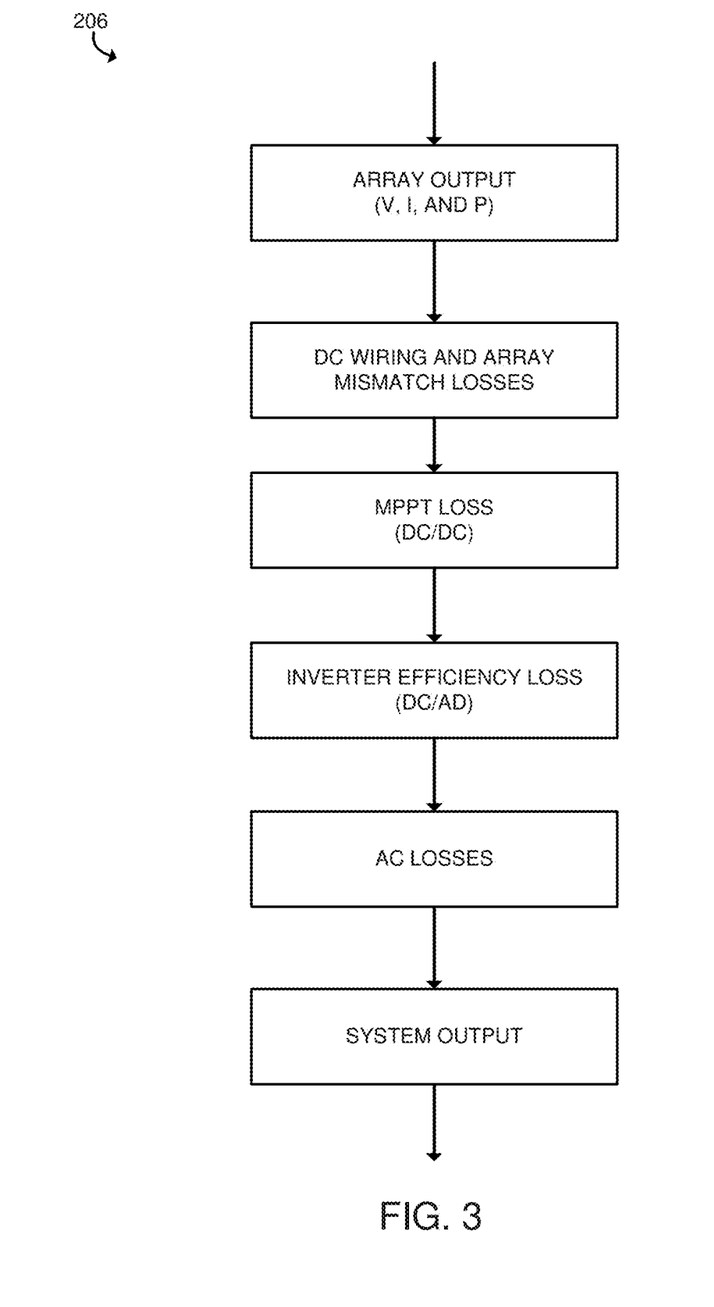
FIG. 3 is a simplified block diagram illustrating a loss model for the power plant of FIG. 1 that may be compensated using a site compensation model of FIG. 2.

However, it should be noted that an output (i.e., AC power) of the DAC converter 140 may not be the system output with respect to the power exported to the grid. Accordingly, the site compensation model 206 is configured to determine and compensate losses and local consumption, which may be included in engineering tolerances. For example, AC losses for utility scale plants may be significant when the AC power is transferred over a distance before reaching a utility meter. As illustrated in FIG. 3, there are additional loss elements and possibly local loads and storage that can be included in the site compensation model 206. When the DAC converter 140 is in the MPPT mode, these losses can be directly estimated in near real-time and factored in the peak power estimation by applying a non-negative least squares method. In some embodiments, the site compensation model 206 may be realized as a multiplicative or additive factor in its simplest form.

Figure 4:
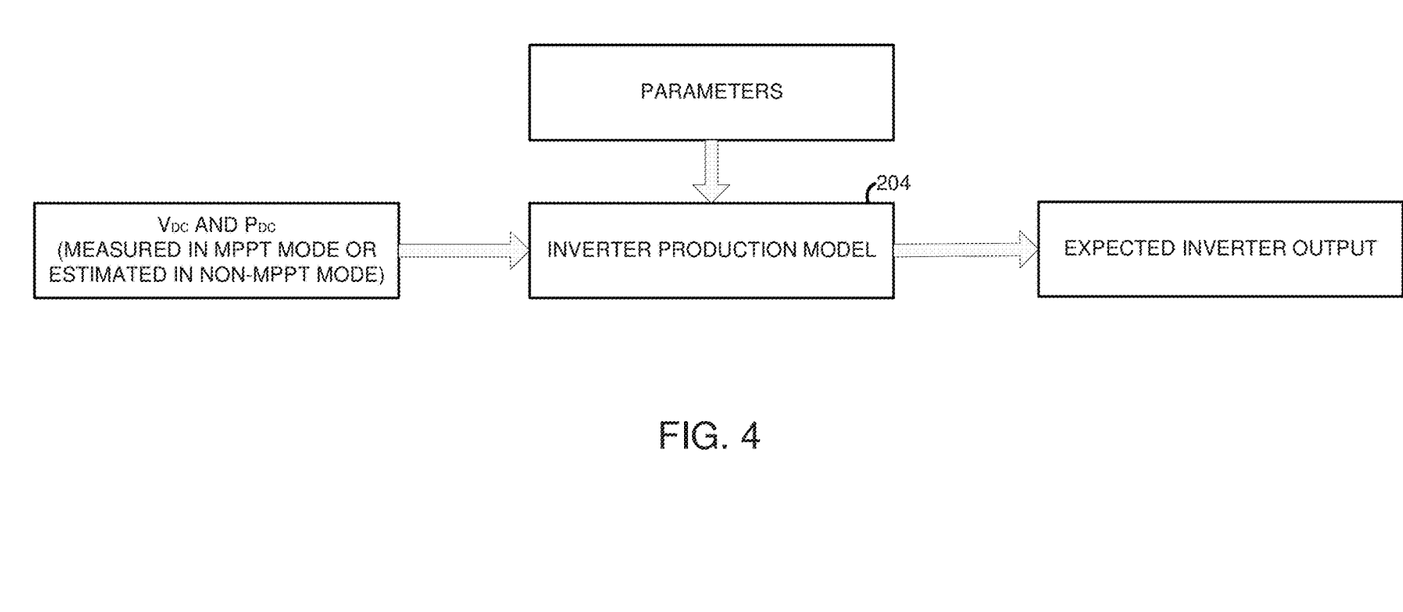
FIG. 4 is a simplified block diagram of at least one embodiment of an inverter production model of the system production model of FIG. 2.

The inverter production model 204, which relates inverter DC inputs to its expected AC output under a nominal configuration, is used to account for inverter efficiency. Inverter efficiency is defined as the ratio of AC output power to DC input power and varies with AC output power, DC voltage, and/or inverter temperature as shown in equation (2).

$$P_{AC}(t) = f(P_{DC}(t), V_{DC}(t), T(t), \text{params}) \qquad (2)$$

Figure 5:
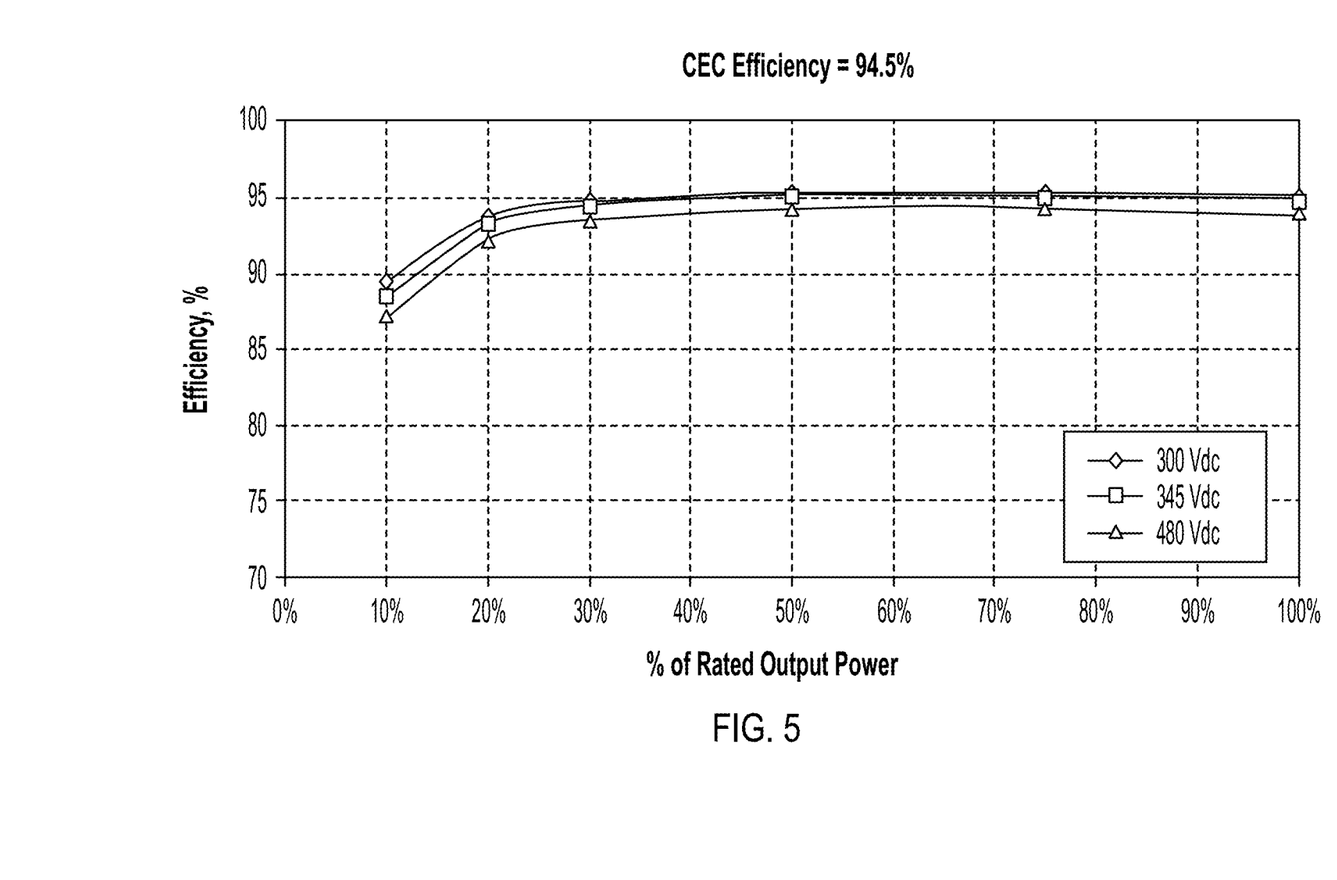
FIG. 5 is a graph illustrating at least one embodiment of an inverter efficiency determination as a function of output power.

A loss in the efficiency of the DAC converter 140 may be a significant source of error in the APP estimation when the inverter operates near or at a fractional output power. This is illustrated in an exemplary efficiency characterization graph in FIG. 5. The graph was generated using a test protocol (e.g., California Energy Commission (CEC) test protocol) that measured inverter efficiency at six power levels (10%, 20%, 30%, 50%, 75%, and 100% of rated output AC power) and at three DC voltage levels (Vmin, Vnom, and Vmax) for a total of 18 measurements. The nominal efficiency was determined by taking a weighted sum. As can be seen in FIG. 5, the inverter efficiency is optimized for higher output powers.

It should be noted that the expected output of the inverter 140 determined using the inverter production model 204 is a real-time estimation of inverter output based on measured (in MPPT mode) or estimated (in non-MPPT mode) inputs ($V_{DC}$, $I_{DC}$, and/or $P_{DC}$). In other words, unlike a forecast output that is based on historical measurements, the estimated output is based on the real-time measurements or estimations of input variables. If high accuracy forecasted values are available, the output is the forecasted output, which is still valuable for production scheduling for day-ahead or longer market participation. It should be appreciated that, in the illustrative embodiment, historical measurements may be used to train machine learning models for model tuning and maintenance. Illustrative technologies for model tuning that may be utilized with the present disclosure are further described in commonly-owned PCT International Application No. PCT/US2019/040663, filed on Jul. 2, 2019, and entitled "Technologies for Solar Power System Performance Model Tuning," the entire disclosure of which is incorporated herein by reference.

The expected power supplied by the inverter production model 204 at time t under the MPPT mode is the available peak power (APP) for that instance which should closely match the measured output power of the inverter 140. On the other hand, the expected power calculated from the inverter production model 204 at time t under the commanded or non-MPPT mode is the available peak power with respect to the inverter output for that instance. As described above, the inverter may not operate the array near the MPP point in the commanded or non-MPPT mode, and the maximum DC power from the array is unknown. However, direct measurement of the maximum power can only be done if the inverter is disconnected from the panel, which is practically not feasible online. As such, the maximum available peak power (APP) is estimated from the current-voltage (I-V) curve.

Figure 6:
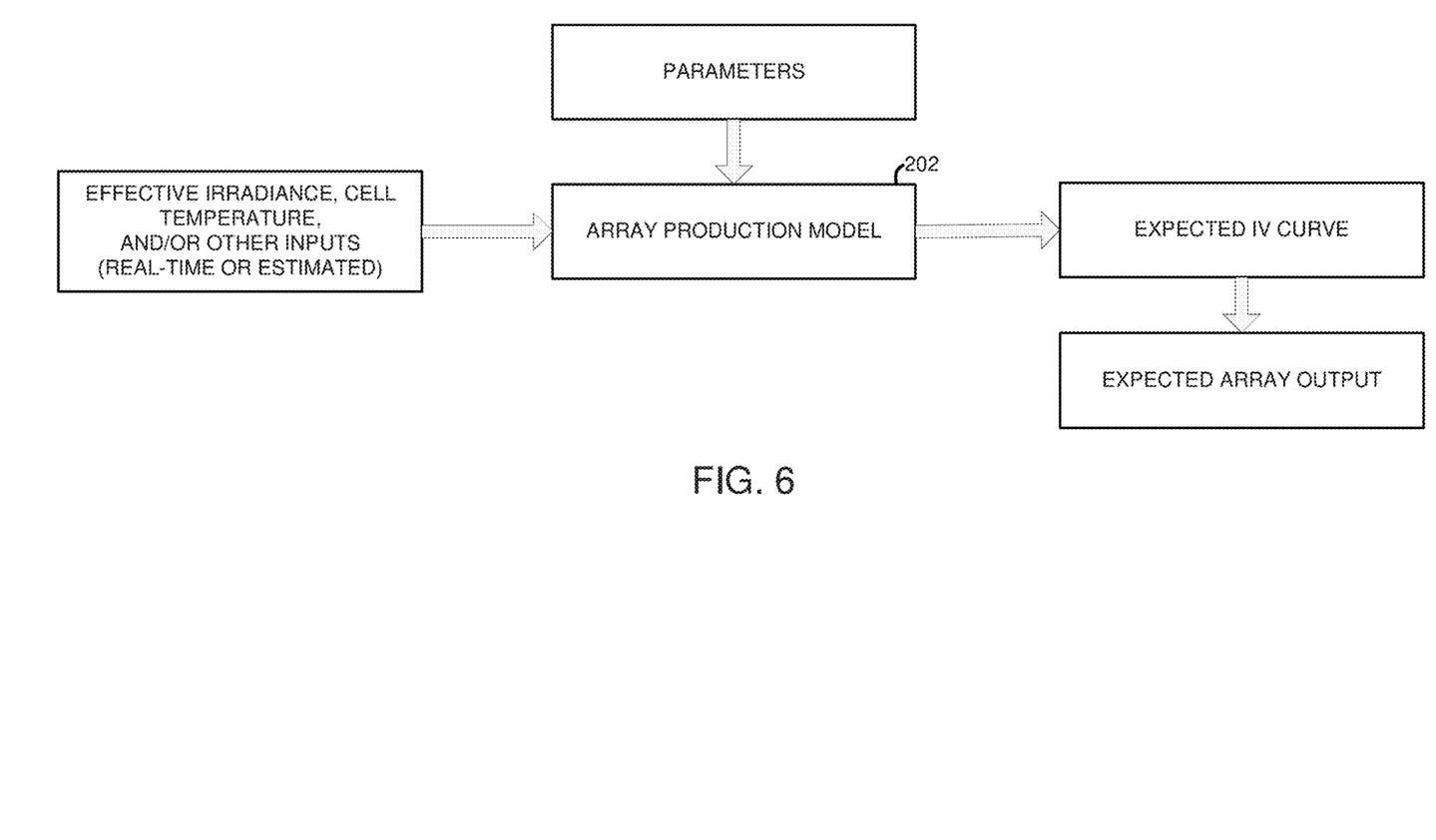
FIG. 6 is a simplified block diagram of at least one embodiment of an array production model of the system production model of FIG. 2.

The array production model 202 in reference to FIG. 6 may be any validated model that relates solar irradiance to expected power output. Acting as a "digital twin," it may be expressed in an analytical form (stateless model) or derived from a machine leaning exercise using regression, neural network, or other techniques. In general, the model may follow the general mathematical relationship below.

$$(I_{mp}, V_{mp}) = f(E_e, T, params) \quad (3)$$

$$P_{mp} = V_{mp} * I_{mp} \quad (4)$$

Figure 7:
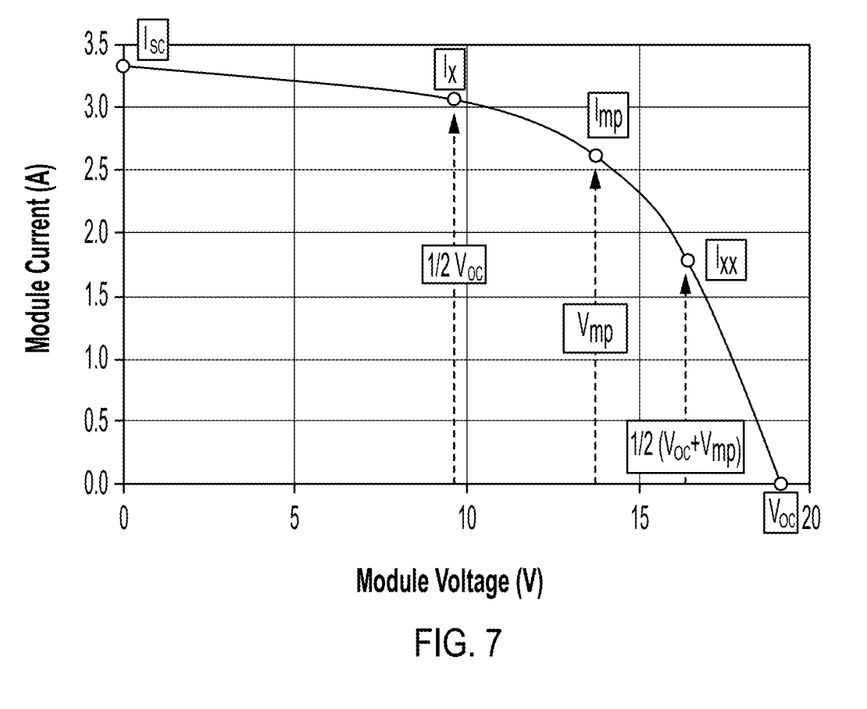
FIG. 7 is a graph illustrating array production model parameters of FIG. 6.

For example, a graph shown in FIG. 7 illustrates an exemplary array production model 202 that defines five points on the I-V curve for a given irradiance and temperature. These points consist of open circuit voltage, short circuit current, maximum power point, and two halfway axillary data points. A solar panel consists of several PV modules that are electrically connected in series (boosting voltage) or parallel (boosting current) and mounted on a supporting structure. In general, for the I-V characteristics of a module consisting of m identical cells in series and n identical cells in parallel, the voltage multiplies by a factor of m while the current multiplies by a factor of n. This preserves the overall shape of the I-V curve where there is only one MPP. In some embodiments, the I-V curve may have several local maxima due to partial shading and manufacturing defects in cell homogeneity that result in mismatch losses.

Figure 8:
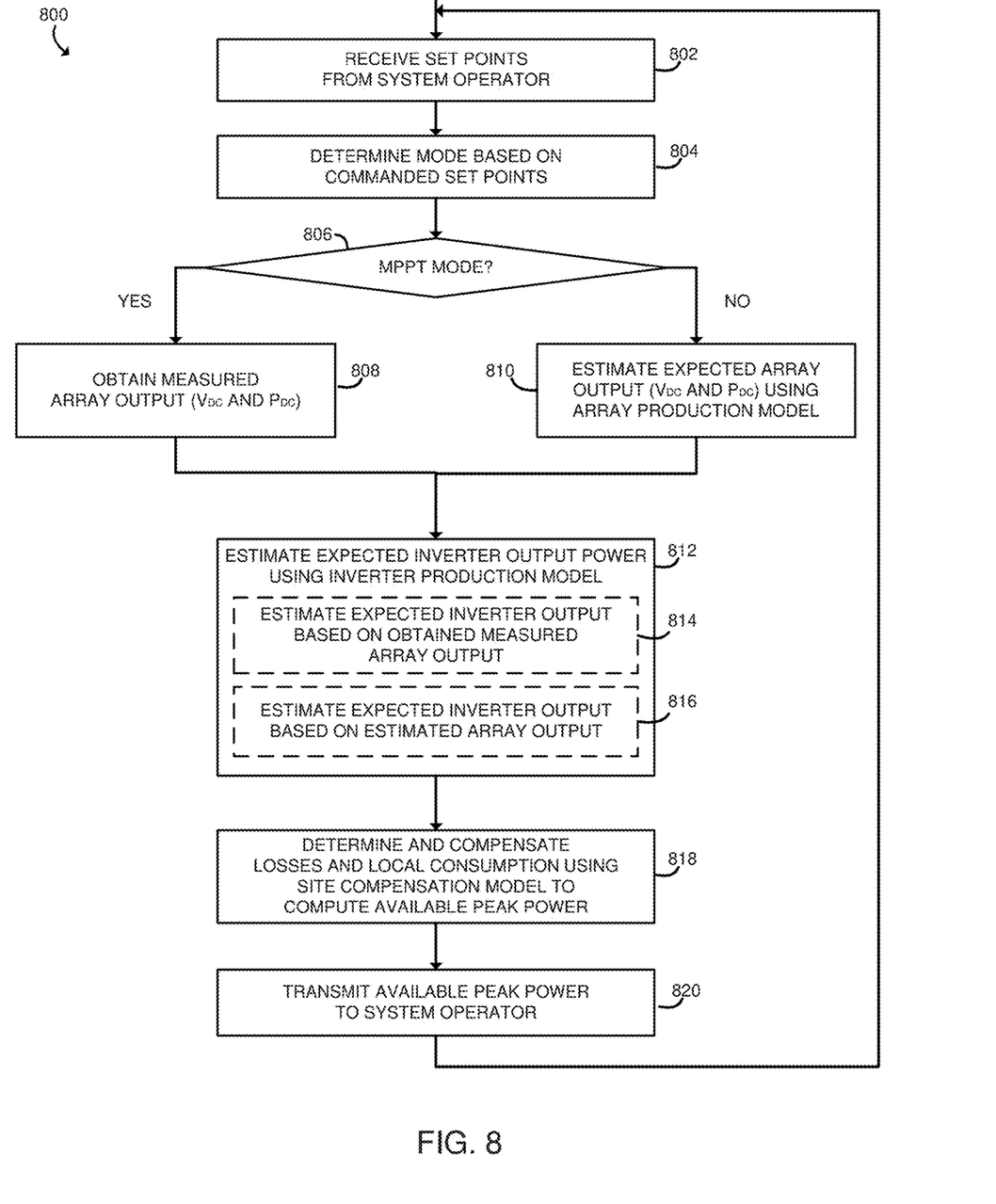
FIG. 8 is a simplified flow diagram of at least one embodiment of a method for available peak power estimation that may be executed by a power controller of the power plant of FIG. 1.

Referring now to FIG. 8, in use, the power controller 120 may execute a method 800 for estimating real-time available peak power using the system production model 200 to enable operational planning and market participation features of a grid-tied photovoltaics (PV) system. The method 800 begins with block 802, in which the power controller 120 receives set points from the system operator 104. Based on the commanded set points, the power controller 120 determines whether the inverter 140 is set to run in MPPT mode as illustrated in block 804. As described above, the inverter 140 in the MPPT mode is adapted to generate maximum output according to its MPPT algorithm. In the non-MPPT mode, the output of the inverter 140 is curtailed based on the commanded set points to provide the necessary headroom from reliability services.

If the power controller 120 determines that the inverter 140 is in MPPT mode in block 806, the method 800 advances to block 808 to obtain measured array output (e.g., $V_{DC}$ and $P_{DC}$). For example, the power controller 120 may determine that the inverter 140 is in MPPT mode if dispatch set points from the system operator 104 allow maximum rated power. In other embodiments, the inverter 140 may be in MPPT mode when no grid support is required to maximize the output as an energy resource. If, however, the power controller 120 determines that the inverter 140 is non-MPPT or commanded mode, the method 800 advances to block 810 to estimate expected array output using the array production model 202.

Subsequently, in block 812, the power controller 120 estimates expected inverter output power using the inverter production model 204. To do so, in MPPT mode, the power controller 120 estimates the expected inverter output AC power based on the obtained measured array output as illustrated in block 814. In non-MPPT mode, the power controller 120 estimates the expected inverter output AC power based on the estimated output as illustrated in block 816.

In block 818, the power controller 120 determines and compensates losses and local consumption using the site compensation model 206 to compute available peak power. After factoring in the compensation model 206, the power controller 120 provides a real-time power estimation that is reflective of the latest changes in weather conditions and takes into account the array and inverter performance. However, it should be appreciated that, in some embodiments, the power controller 120 may skip block 818 if the loss compensation is not applicable.

In the MPPT mode, the difference between the expected output and measured output generates an error signal, which should be within a predefined tolerance range (the models are calibrated for that during the MPPT mode). If the difference between the expected output and measured output is not within the predefined tolerance range, the error signal is fed back to the system production model 200 for model precision tuning and/or fine-tuning. By tuning the model and tracing performance issues related to the inverter 140 and array 130, the composite system production model 200 is configured to maintain the required precision and accuracy for peak power estimation. It is noted that intentional or scheduled de-rating caused by grid instability, inverter clipping, and other operational parameter violations (e.g. thermal limits) can also cause excursions in the error signal. It should be appreciated that, in some embodiments, the MPPT mode may be the prevailing mode of operation, which allows for frequent model maintenance and precision tuning under a wide variety of environmental conditions. Subject to ramp rate limitations and interconnection requirements, the inverter 140 may be operated in a simulated MPPT mode in which it switches briefly—within milliseconds—to the next best maximum power point to collect data for incremental error correction that may have been accumulated over an extended period of non-MPPT operation.

In block 820, the power controller 120 transmits the available peak power to the system operator 104 to update the available peak power for the next interval, which is used to update the set points of the inverter 140. In other words, the expected site output or capability is estimated by the system production model 200 and periodically or continually communicated with the system operator 104. As discussed above, as the input to the plant 102 (e.g., irradiance) constantly changes, a capability curve (also known as operating charts or capability charts) of the power plant 102 is not fixed and needs to be dynamically adjusted to account for changes in the solar irradiance and plant performance. The dispatch center or system operator 104 determines the new set points based on the latest capability curve of the solar site and sends those set points back to the power controller 120 for execution. It should be appreciated that, in some embodiments, new set points may be determined using a peer-to-peer energy exchange system between the power controllers 120 of the power plants 102.

Subsequently, the method 800 loops back to block 802 to continue updating available peak power of the power plant 102. It should be appreciated that the method 800 may be performed periodically or continually. The time period may be as low as seconds to minutes or hours.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There exist a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A method for estimating real-time available peak power (APP) of a power plant, the power plant comprising at least one solar panel array and an inverter electrically coupled to the at least one solar panel array, the method comprising:
   determining whether the inverter is operating in a maximum power point tracking (MPPT) mode;
   obtaining a measured output of the at least one solar panel array in response to determining that the inverter is operating in the MPPT mode;
   estimating, using an inverter production model, an expected output of the inverter as a function of the measured output of the solar panel array; and
   estimating, using a site compensation model, the available peak power (APP) of the power plant as a function of the expected output of the inverter.

2. The method of claim 1, further comprising:
   estimating, using an array production model, an expected output of the at least one solar panel array in response to determining that the inverter is not operating in the MPPT mode; and
   estimating, using the inverter production model, the expected output of the inverter as a function of the expected output of the solar panel array.

3. The method of claim 2, wherein the array production model is a validated model that relates solar irradiance levels to expected outputs of the at least one solar panel array.

4. The method of claim 1, wherein the inverter production model relates direct current (DC) inputs of the inverter to expected alternating current (AC) outputs of the inverter.

5. The method of claim 1, wherein the site compensation model characterizes local losses associated with the power plant.

6. The method of claim 1, wherein determining whether the inverter is operating in the MPPT mode comprises referencing set points for the inverter received from a system operator of the power plant.

7. The method of claim 6, further comprising transmitting the estimation of the APP to the system operator for use in updating the set points for the inverter.

8. The method of claim 7, further comprising repeating the method to generate a new estimation of the APP of the power plant at least once during every dispatch cycle of the system operator.

9. The method of claim 1, wherein the measured output of the at least one solar panel array is obtained in real-time and without taking the inverter off-line.

10. One or more non-transitory computer-readable media storing a plurality of instructions that, when executed by a power controller operatively connected to (i) at least one solar panel array and (ii) an inverter electrically coupled to the at least one solar panel array, cause the power controller to:
    determine whether the inverter is operating in a maximum power point tracking (MPPT) mode;
    if the inverter is determined to be operating in the MPPT mode, obtain a measured output of the at least one solar panel array;
    if the inverter is determined not to be operating in the MPPT mode, estimate an expected output of the at least one solar panel array using an array production model;
    estimate, using an inverter production model, an expected output of the inverter as a function of the measured or expected output of the solar panel array; and
    estimate, using a site compensation model, the available peak power (APP) of the power plant as a function of the expected output of the inverter.

11. The non-transitory one or more computer-readable media of claim 10, wherein:
    the array production model is a validated model that relates solar irradiance levels to expected outputs of the at least one solar panel array;
    the inverter production model relates direct current (DC) inputs of the inverter to expected alternating current (AC) outputs of the inverter; and
    the site compensation model characterizes local losses associated with the power plant.

12. The non-transitory one or more computer-readable media of claim 10, wherein the plurality of instructions cause the power controller to determine whether the inverter is operating in the MPPT mode by referencing set points for the inverter received from a system operator of the power plant.

13. The non-transitory one or more computer-readable media of claim 12, wherein the plurality of instructions further cause the power controller to transmit the estimation of the APP to the system operator for use in updating the set points for the inverter.

14. The non-transitory one or more computer-readable media of claim 12, wherein the plurality of instructions cause the power controller to generate a new estimation of the APP of the power plant at least once during every dispatch cycle of the system operator.

15. A power plant comprising:
   at least one solar panel array;
   an inverter electrically coupled to the at least one solar panel array; and
   a power controller operatively connected to the at least one solar panel array and to the inverter, the power controller being configured to:
      determine whether the inverter is operating in a maximum power point tracking (MPPT) mode;
      if the inverter is determined to be operating in the MPPT mode, obtain a measured output of the at least one solar panel array;
      if the inverter is determined not to be operating in the MPPT mode, estimate an expected output of the at least one solar panel array using an array production model;
      estimate, using an inverter production model, an expected output of the inverter as a function of the measured or expected output of the solar panel array; and
      estimate, using a site compensation model, the available peak power (APP) of the power plant as a function of the expected output of the inverter.

16. The power plant of claim 15, wherein:
   the array production model is a validated model that relates solar irradiance levels to expected outputs of the at least one solar panel array;
   the inverter production model relates direct current (DC) inputs of the inverter to expected alternating current (AC) outputs of the inverter; and
   the site compensation model characterizes local losses associated with the power plant.

17. The power plant of claim 15, wherein the power controller is configured to determine whether the inverter is operating in the MPPT mode by referencing set points for the inverter received from a system operator of the power plant.

18. The power plant of claim 17, wherein the power controller is further configured to transmit the estimation of the APP to the system operator for use in updating the set points for the inverter.

19. The power plant of claim 17, wherein the power controller is configured to generate a new estimation of the APP of the power plant at least once during every dispatch cycle of the system operator.

20. The power plant of claim 15, wherein the power controller is configured to obtain the measured output of the at least one solar panel array in real-time and without taking the inverter off-line.

* * * * *